(12) United States Patent
Choi (10) Patent No.: US 9,698,682 B2
(45) Date of Patent: Jul. 4, 2017

(54) LOW VOLTAGE DC-DC CONVERTER (LDC) CONTROL APPARATUS FOR PREVENTING OVERHEAT OF LDC AND METHOD OF OPERATING THE SAME

(71) Applicant: HYUNDAI MOBIS CO., Ltd, Seoul (KR)

(72) Inventor: Deok Kwan Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 17 days.

(21) Appl. No.: 14/874,920

(22) Filed: Oct. 5, 2015

(65) Prior Publication Data

US 2016/0105105 A1    Apr. 14, 2016

(30) Foreign Application Priority Data

Oct. 6, 2014 (KR) .................. 10-2014-0134432

(51) Int. Cl.
*G05F 1/569*  (2006.01)
*H02M 3/156*  (2006.01)
*H02M 1/32*   (2007.01)

(52) U.S. Cl.
CPC ............ *H02M 3/156* (2013.01); *H02M 1/32* (2013.01); *H02M 2001/327* (2013.01)

(58) Field of Classification Search
CPC ........ H02M 1/32; H02M 3/156; H02M 3/157; H02M 3/155; H02M 3/158; H02M 3/1582; H02M 2001/327; H02M 2003/1566; G05F 1/569; G05F 1/575

USPC ................... 323/276, 277, 282–285; 361/18
See application file for complete search history.

(56) References Cited

U.S. PATENT DOCUMENTS

| 6,806,695 | B1* | 10/2004 | Broach ............ H03K 19/00369 323/364 |
| 6,861,824 | B1* | 3/2005 | Liu ........................ H02J 7/0068 320/137 |
| 2006/0091872 | A1* | 5/2006 | Matsuura .............. H02M 3/156 323/283 |
| 2009/0295350 | A1* | 12/2009 | Yamada .............. H02M 3/1588 323/282 |
| 2010/0308774 | A1* | 12/2010 | Park ........................ G06F 1/206 320/153 |
| 2012/0091816 | A1* | 4/2012 | Liu ........................ H02J 7/022 307/80 |
| 2013/0076324 | A1* | 3/2013 | Fujii ...................... B60R 16/03 323/276 |
| 2016/0036340 | A1* | 2/2016 | Kikuchi .................. H02M 1/32 363/21.14 |

* cited by examiner

*Primary Examiner* — Adolf Berhane
(74) *Attorney, Agent, or Firm* — NSIP Law (57) ABSTRACT

Disclosed are an LDC control apparatus for preventing an LDC from being overheated, and a method of operating the same. The LDC control apparatus includes a comparator configured to compare a heat release temperature of an LDC with a predetermined criterion temperature, an adjustor configured to adjust a predetermined criterion current value according to a result of the comparison of temperature, and a controller configured to compare the adjusted criterion current value with an output current value being output from the LDC, and control the LDC by converting a control mode of the LDC according to a result of the comparison of current.

10 Claims, 7 Drawing Sheets

LOW VOLTAGE DC-DC CONVERTER (LDC) CONTROL APPARATUS FOR PREVENTING OVERHEAT OF LDC AND METHOD OF OPERATING THE SAME

CROSS-REFERENCE TO RELATED APPLICATION

This application claims priority to and the benefit of Korean Patent Application No. 10-2014-0134432, filed on Oct. 6, 2014, the disclosure of which is incorporated herein by reference in its entirety.

BACKGROUND

1. Field of the Invention

The present invention relates to a low voltage DC-DC converter (LDC) for a vehicle, and more particularly, to a technology for preventing an LDC from being overheated.

2. Discussion of Related Art

Electric vehicles of today, such as hybrid electric vehicles (HEV), fuel cell electric vehicles, and fuel cell hybrid vehicles, each are provided with a low voltage DC/DC converter (LDC) that serves as an alternator of a general gasoline vehicle. The low voltage DC/DC converter converts a high voltage (for example, 144 V, DC) of energy regenerated by a main battery or a driving motor to a low voltage 12 V (DC), and charges an auxiliary battery with the converted voltage or supplies power to electronic apparatus loads.

In order to extend lifespans of input/output batteries and ensure stable operations of electronic components using the batteries (a head lamp, an audio system and various electronic control units), it is important to keep a low voltage DC-DC converter in operation.

Meanwhile, when an LDC is overheated due to overload under the condition in which an additional cooling fan or a forced air cooling providing coolant are not available, the conventional converter control apparatus forcedly stops an operation of the LDC to lower the heat release temperature of the LDC. However, if the operation of the LDC is forcedly stopped due to overheat, the battery of 12 V is not stably charged, which degrades the reliability of the whole motor system of the vehicle.

SUMMARY OF THE INVENTION

The present invention is directed to a technology for controlling an LDC capable of preventing the LDC from forcedly being stopped due to overheating.

According to an aspect of the present invention, there is provided a low voltage DC-DC converter (LDC) control apparatus including a comparator, an adjustor and a controller. The comparator may be configured to compare a heat release temperature of an LDC with a predetermined criterion temperature. The adjustor may be configured to adjust a predetermined criterion current value according to a result of the comparison of temperature. The controller may be configured to compare the adjusted criterion current value with an output current value being output from the LDC, and control the LDC by converting a control mode of the LDC according to a result of the comparison of current.

The adjuster may subtract a predetermined current value from the criterion current value if the heat release temperature is higher than the criterion temperature.

The adjuster may subtract a predetermined current value corresponding to a difference between the heat release temperature and the criterion temperature from the criterion current value if the heat release temperature is higher than the criterion temperature.

The controller may convert a control mode of the LDC to a constant current (CC) mode in which an output current of the LDC is controlled to correspond to the criterion current value if the output current value exceeds the criterion current value.

The controller may convert a control mode of the LDC to a constant voltage (CV) mode in which an output voltage of the LDC is controlled to correspond to a predetermined criterion voltage value if the output current value is equal to or lower than the criterion current value.

The LDC may be a buck-boost converter for a 48 V mild hybrid system.

According to another aspect of the present invention, there is provided a method of preventing overheat of a low voltage DC-DC converter (LDC) by using an LDC control apparatus, the method including comparing a heat release temperature of the LDC with a predetermined criterion temperature; adjusting a predetermined criterion current value according to a result of the comparison of temperature; comparing the adjusted criterion current value with an output current value being output from the LDC; and controlling the LDC by converting a control mode of the LDC according to a result of the comparison of current.

In the adjusting of a predetermined criterion current value according to a result of the comparison of temperature, a predetermined current value may be subtracted from the criterion current value if the heat release temperature is higher than the criterion temperature.

In the adjusting of a predetermined criterion current value according to a result of the comparison of temperature, a predetermined current value corresponding to a difference between the heat release temperature and the criterion temperature may be subtracted from the criterion current value if the heat release temperature is higher than the criterion temperature.

In the controlling of the LDC by converting a control mode of the LDC according to a result of the comparison of current, a control mode of the LDC may be converted to a constant current (CC) mode in which an output current of the LDC is controlled to correspond to the criterion current value if the output current value exceeds the criterion current value.

In the controlling of the LDC by converting a control mode of the LDC according to a result of the comparison of current, a control mode of the LDC may be converted to a constant voltage (CV) mode in which an output voltage of the LDC is controlled to correspond to a predetermined criterion voltage value if the output current value is equal to or lower than the criterion current value.

The LDC may be a buck-boost converter for a 48 V mild hybrid system.

As is apparent from the above, the LDC control apparatus can perform subtraction on a predetermined criterion current value if the LDC has a heat release temperature higher than a predetermined criterion temperature, and controls the operation of the LDC in consideration of the criterion current value having subject to the subtraction, thereby preventing the LDC from releasing heat due to overload, and preventing the LDC from stopping its operation due to the heat release.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The advantages and features of the present invention, and methods of accomplishing the same, will become readily apparent with reference to the following detailed description and the accompanying drawings. However, the scope of the present invention is not limited to embodiments disclosed herein, and the present invention may be realized in various forms. The embodiments to be described below are provided merely to fully disclose the present invention and assist those skilled in the art in thoroughly understanding the present invention. The present invention is defined only by the scope of the appended claims. Meanwhile, the terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings. The same reference numerals are used to designate the same elements throughout the drawings. Descriptions of well-known functions and structures are omitted to enhance clarity and conciseness.

A low voltage DC-DC converter (LDC) control apparatus having an overheat prevention function according to an exemplary embodiment of the present invention, when a low voltage DC-DC converter (LDC) is overheated, adjusts a criterion current value and controls an operation of the LDC in consideration of the adjusted criterion current value.

The following description will be made on the assumption that an LDC is overheated by an excessively high temperature due to overload but a cooling fan or a forced air cooling for supplying coolant are not available. That is, the LDC according to an exemplary embodiment of the present invention needs to be subject to air cooling rather than forced air cooling.

In addition, the LDC according to an exemplary embodiment of the present invention may be provided using a belt-driven 48 V mild hybrid DC-DC converter. Such a 48 V mild hybrid LDC produces a higher voltage when compared to the conventional 12 V system, thereby reducing power loss in the trend of a motor having a high power.

Figure 1:
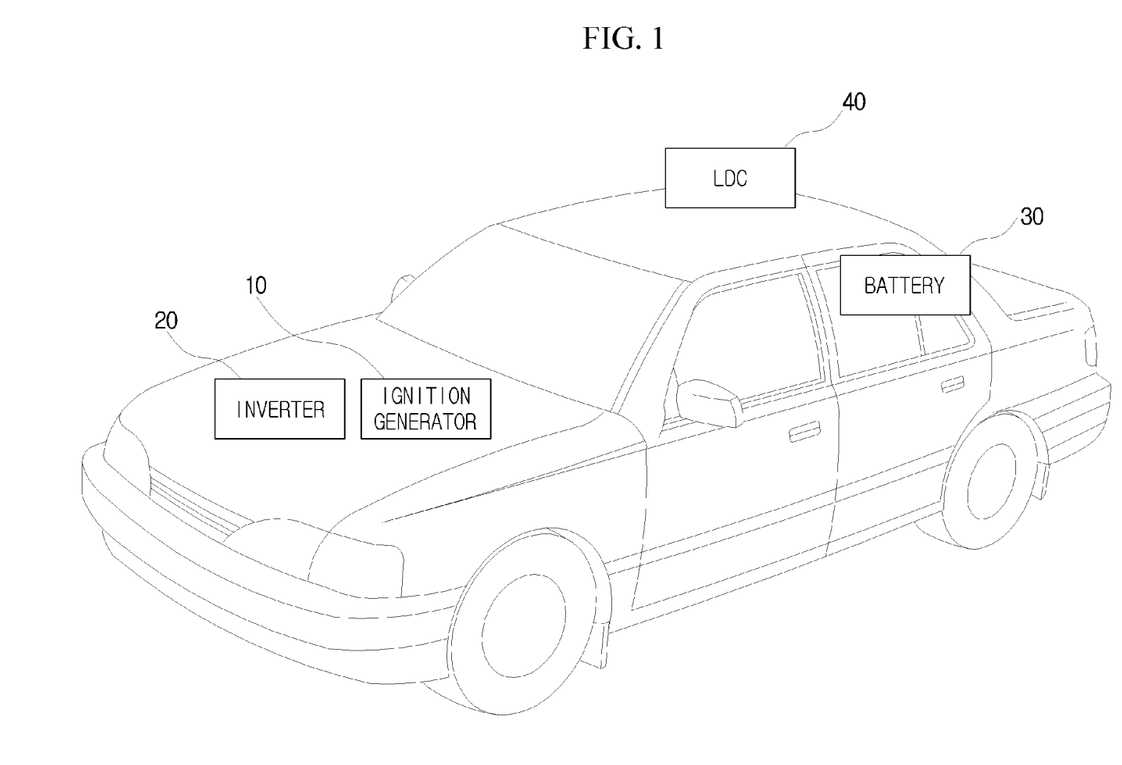
FIG. 1 is a diagram illustrating the entire configuration of a hybrid vehicle implemented using an LDC according to an exemplary embodiment of the present invention.

For example, referring to FIG. 1, a vehicle using a 48 V mild hybrid DC-DC converter has a bonnet, in which a 48 V belt-driven alternator (an ignition generator) 10, a motor (starter) and an inverter 20 are mounted, and a trunk, in which a 48 V lithium ion battery 30 and an LDC 40 are mounted.

Figure 2:
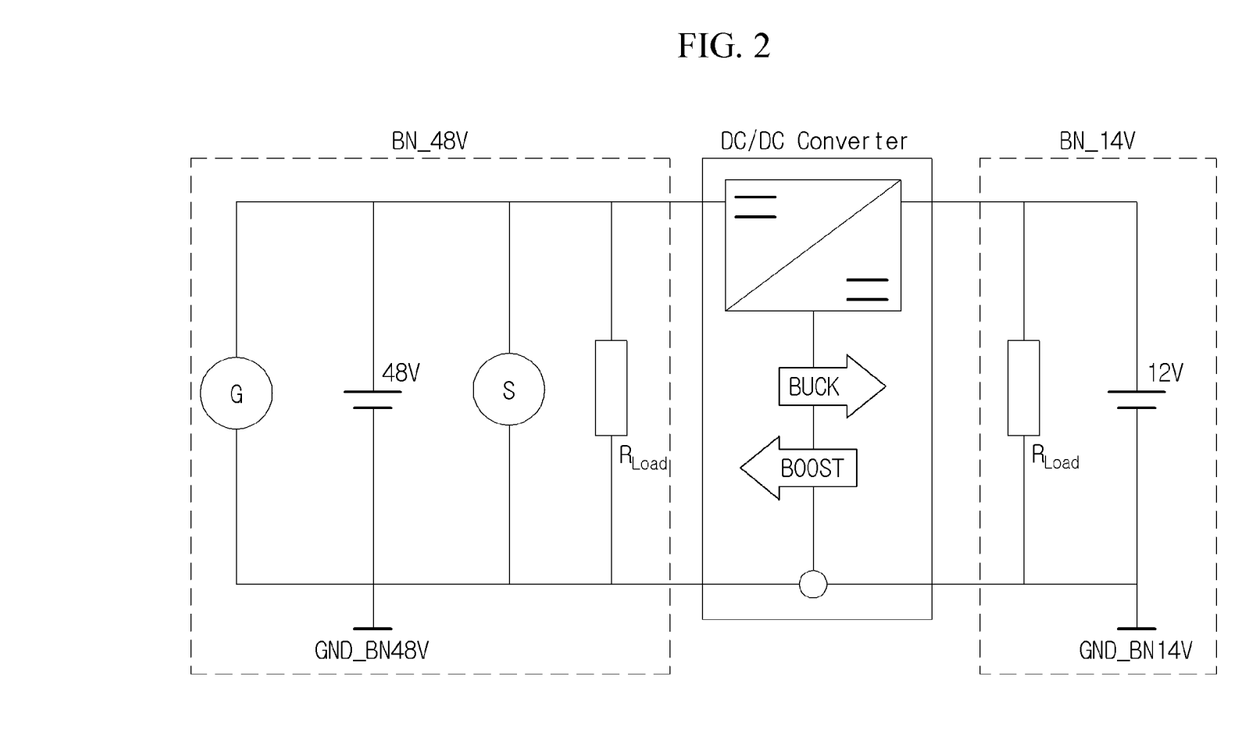
FIG. 2 is a diagram illustrating a configuration circuit of an LDC for a 48 V mild hybrid system according to an exemplary embodiment of the present invention.

The 48 V mild hybrid DC-DC converter, which is a bi-directional DC-DC converter, connects low voltage batteries to each other in the form of a circuit as shown in FIG. 2. For example, the bi-directional DC-DC converter operates to transfer power from a 48 V side to a 12 V side in a boost mode, and transfer power from a 12 V side to a 48 V side in a buck mode.

Different from the conventional hard type HEV, the 48 V mild hybrid LDC is not electrically driven. For example, during running a vehicle using the 48 V mild hybrid LDC, when a stepping force applied to an acceleration pedal of the vehicle is removed, the vehicle is not converted to a low speed EV mode in which the rotational speed of an engine is lowered to an idle speed, but is turned off as in an idling stop system. That is, a vehicle using a 48 V mild hybrid LDC does not only have a regenerative and an assist function through a 48 V power alternator/motor but also provides a coasting function to move by force of inertia idling or stopping an engine at a downhill, thereby improving the fuel efficiency.

Figure 3:
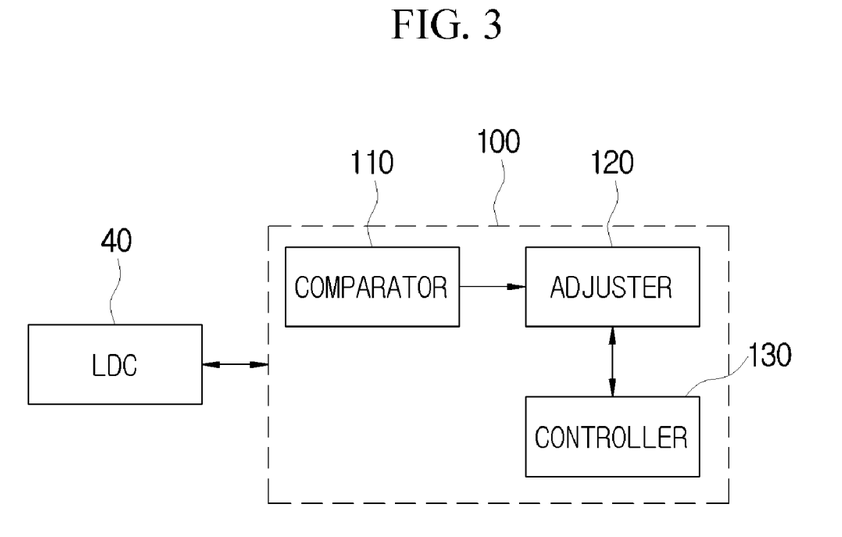
FIG. 3 is a block diagram illustrating an LDC control apparatus for preventing an LDC from being overheated according to an exemplary embodiment of the present invention.

FIG. 3 is a block diagram illustrating an LDC control apparatus for preventing an LDC from being overheated according to an exemplary embodiment of the present invention. Referring to FIG. 3, an LDC control apparatus 100 includes a comparator 110, an adjuster 120 and a controller 130.

The comparator 110 compares a heat release temperature Temp of the LDC 40 with a predetermined criterion temperature CT_set. The comparator 110 may acquire current heat release temperature information Temp about the LDC 40 from a temperature sensor that measures the temperature of the LDC 40. The criterion temperature CT_set may be previously stored in an additional memory, and may be set to a temperature that affects the operation of the LDC 40 (for example, 105°).

The adjuster 120 adjusts a predetermined criterion current value CC_set according to a result of the comparison of temperature by the comparator 110. A default value of the criterion current value CC_set may be previously stored in an additional memory, and may be set to a current value that affects the operation of the LDC 40 (for example, 180 A).

For example, the adjuster 120 performs subtraction on the criterion current value CC_set if the heat release temperature Temp of the LDC 40 is determined to be higher than the criterion temperature CT_set as a result of the comparison of temperature by the comparator 110.

As one example, the adjuster 120 subtracts a predetermined current value (for example, 1 A) from the criterion current value CC_set. The predetermined current value may be a value previously set by an operator.

As another example, the adjuster 120 may subtract a predetermined current value corresponding to a difference between the heat release temperature Temp and the criterion temperature CT_set from the criterion current value CC_set. The predetermined current value for subtraction may be provided in proportion to a magnitude of the difference between the heat release temperature Temp and the criterion temperature CT_set and stored in an additional memory.

The criterion current value adjusted as the above (for example, to CC_set−1 A) may be set as a criterion current value (SET CC_set=CC_set−1 A), and stored in a memory.

If it is determined as a result of the comparison of temperature by the comparator 110 that the heat release temperature Temp of the LDC 40 is equal to or lower than the criterion temperature CT_set, the adjuster 120 maintains the criterion current value CC_set, that is, a default value (SET CC_set=CC_set).

The controller 130 compares the adjusted criterion current value (CC_set) with an output current value (Iout) being output from the LDC 40, and controls the LDC 40 by converting a control mode of the LDC 40 according to a result of the comparison of current. In this case, the controller 130 may acquire a current output current value of the LDC 40 from a current sensor that measures the output current of the LDC 40.

Figure 4A:
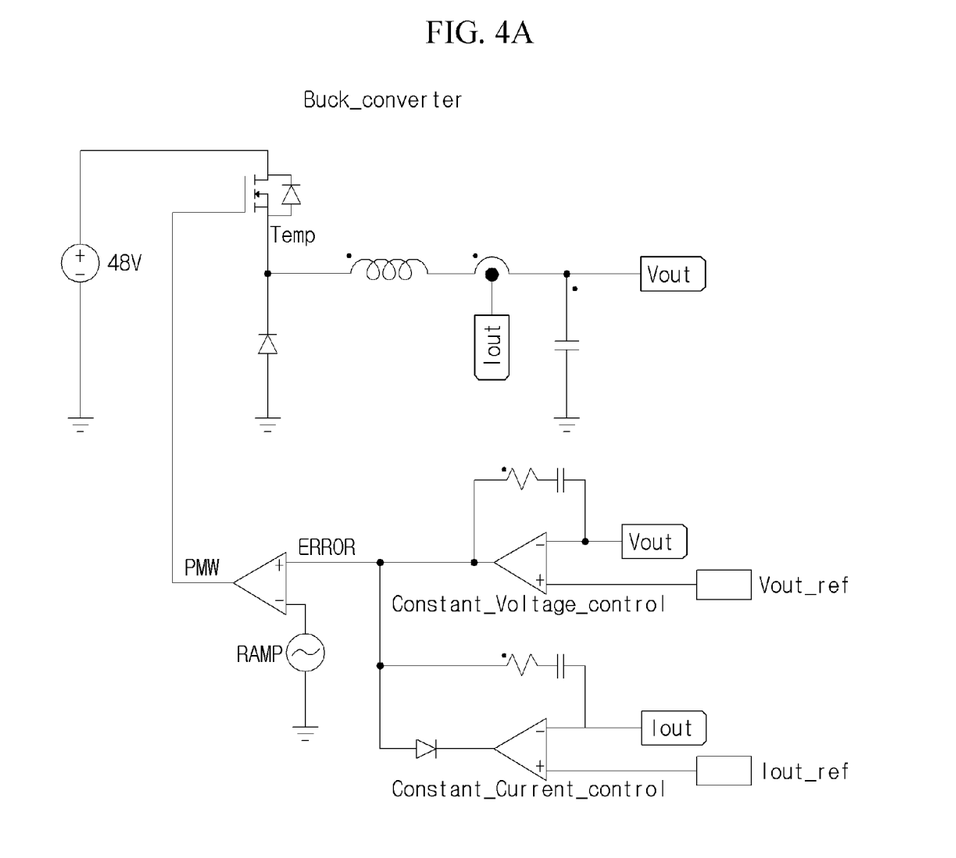
FIGS. 4A and 4B are a diagram illustrating control modes of an LDC according to an exemplary embodiment of the present invention.

In this case, the controller 130 may control the LDC 40 according to a control mode by using a control circuit as shown in FIG. 4A.

Figure 4B:
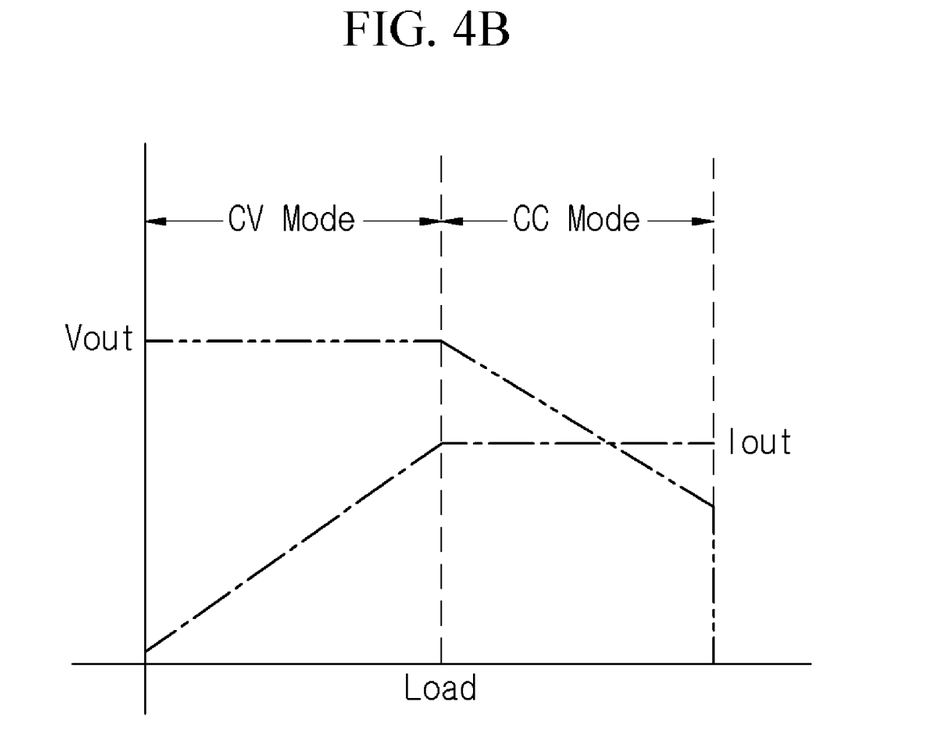

The controller 130 controls to convert the control mode of the LDC 40 to a constant current (CC) mode if the output current value Iout being currently output from the LDC 40 exceeds the adjusted criterion current value CC_set (Iout>CC_set). The constant current mode (CC mode) represents an operation mode to control an output current of the LDC 40 to correspond to a predetermined criterion current value CC_set (Iout_ref=CC_set) such that the output current of the LDC is constant as shown in FIG. 4B. For example, when the criterion current value CC_set is adjusted by the adjuster 120 from the default 180 A to 179 A, the controller 130 in the CC mode controls the LDC 40 to have an output current value Iout of 179 A.

The controller 130 converts the control mode of the LDC 40 to a constant voltage (CV) mode if the output current value Iout being currently output from the LDC 40 Iout is equal to or lower than the adjusted criterion current value CC_set (Iout≤CC_set). The CV mode is an operation mode to control an output voltage of the LDC 40 to correspond to a predetermined criterion voltage value CV_set (Vout_ref=CV_set) such that the output voltage of the LDC is constant as shown in FIG. 4B. The predetermined criterion voltage value CV_set may be a voltage value that needs to be output from the LDC 40 to charge an auxiliary battery (a 12 V battery) or supply power to an electronic apparatus load, for example, 14 V.

As described above, the predetermined criterion current value is subject to subtraction if a heat release temperature of the LDC is higher than a predetermined criterion temperature, and an operation of the LDC is controlled in consideration of the subtracted criterion current value, thereby preventing heat release of the LDC due to overload, and preventing the operation of the LDC from being stopped due to the heat release.

Figure 5:
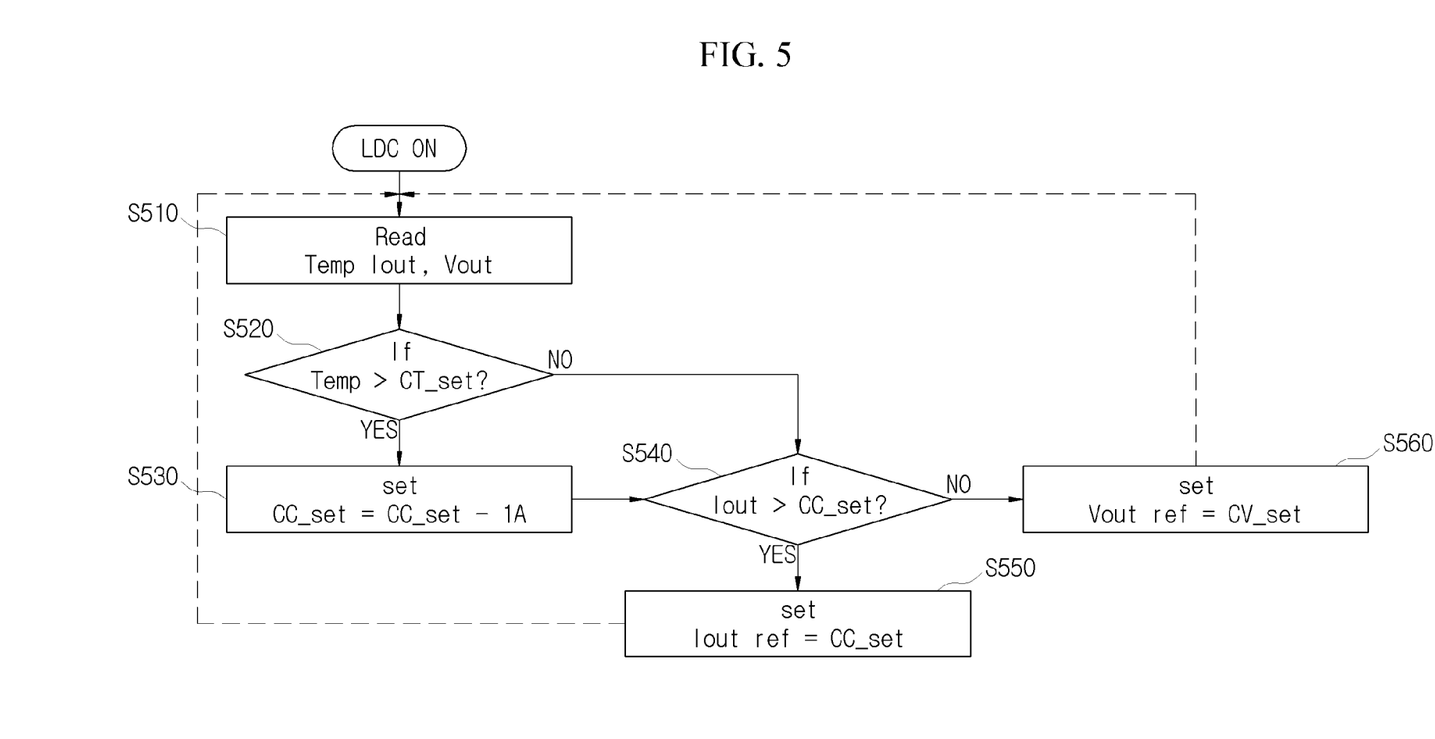
FIG. 5 is a flowchart showing a method of preventing an LDC from being overheated using an LDC control apparatus according to an exemplary embodiment of the present invention.

FIG. 5 is a flowchart showing a method of preventing an LDC from being overheated using an LDC control apparatus according to an exemplary embodiment of the present invention.

When an operation of the LDC is turned on, the LDC control apparatus 100 measures a heat release temperature Temp, a current output current value Iout and a current output voltage value Vout of the LDC 40 (S510). Here, the LDC control apparatus 100 may acquire the current heat release temperature Temp of the LDC 40 from a temperature sensor that measures the temperature of the LDC 40, acquire the current output current value Iout of the LDC 40 from a current sensor that measures the output current of the LDC 40, and acquire the current output voltage value Vout of the LDC 40 from a voltage sensor that measures the output voltage of the LDC 40.

The LDC control apparatus 100 compares a heat release temperature Temp with a predetermined criterion temperature (CT_set) (S520). Here, the criterion temperature CT_set may be previously stored in an additional memory, and may be set to a temperature that affects the operation of the LDC 40 (for example, 105°).

If it is determined from operation S520 that the heat release temperature Temp of the LDC 40 is higher than the criterion temperature CT_set, the LDC control apparatus 100 performs subtraction on the criterion current value CC_set (S530). A default value of the criterion current value CC_set may be previously stored in an additional memory, and may be set to a current value that affects the operation of the LDC 40 (for example, 180 A).

As one example, the LDC control apparatus 100 subtracts a predetermined current value (for example, 1 A) from the criterion current value CC_set. The predetermined current value may be a value previously set by an operator.

As another example, the LDC control apparatus 100 may subtract a predetermined current value corresponding to a difference between the heat release temperature Temp and the criterion temperature CT_set from the criterion current value CC_set. The predetermined current value for subtraction may be provided in proportion to a magnitude of the difference between the heat release temperature Temp and the criterion temperature CT_set and stored in an additional memory.

The criterion current value adjusted as the above, for example, CC_set−1 A may be set as a criterion current value (SET CC_set=CC_set−1 A), and stored in a memory.

If it is determined as a result of the comparison of temperature from operation S520 that the heat release temperature Temp of the LDC 40 is equal to or lower than the criterion temperature CT_set, the LDC control apparatus 100 maintains the criterion current value CC_set that is a default value (SET CC_set=CC_set).

The LDC control apparatus 100 compares the criterion current value (CC_set) adjusted in operation S530 with an output current value (Iout) being output from the LDC 40 (S540). This operation is performed to control the LDC 40 by converting a control mode of the LDC 40 according to a result of the comparison of current.

The LDC control apparatus 100 controls to convert the control mode of the LDC 40 to a constant current (CC) mode if it is determined from operation S540 that the output current value Iout being currently output from the LDC 40 exceeds the adjusted criterion current value CC_set (Iout>CC_set) (S550).

The constant current mode (CC mode) represents an operation mode to control an output current of the LDC 40 to correspond to a predetermined criterion current value CC_set (Iout_ref=CC_set) such that the output current of the LDC is constant as shown in FIG. 4B. For example, when the criterion current value CC_set is adjusted by the adjuster 120 from the default 180 A to 179 A, the LDC control apparatus 100 in the CC mode controls the LDC 40 to have an output current value Iout of 179 A.

The LDC control apparatus 100 converts the control mode of the LDC 40 to a constant voltage (CV) mode if it is determined as a result of the comparison of current from operation S540 that the output current value Iout being currently output from the LDC 40 is equal to or lower than the adjusted criterion current value CC_set (Iout≤CC_set) (S560).

The CV mode is an operation mode to control an output voltage of the LDC 40 to correspond to a predetermined criterion voltage value CV_set (Vout_ref=CV_set) such that the output voltage of the LDC is constant as shown in FIG. 4B. The predetermined criterion voltage value CV_set may be a voltage value that needs to be output from the LDC 40 to charge an auxiliary battery (a 12 V battery) or supply power to an electronic apparatus load, for example, 14 V.

As described above, the predetermined current value is subject to subtraction if a heat release temperature of the LDC is higher than a predetermined criterion temperature, and an operation of the LDC is controlled in consideration of the subtracted criterion current value, thereby preventing heat release of the LDC due to overload, and preventing the operation of the LDC from being stopped due to the heat release.

Figure 6:
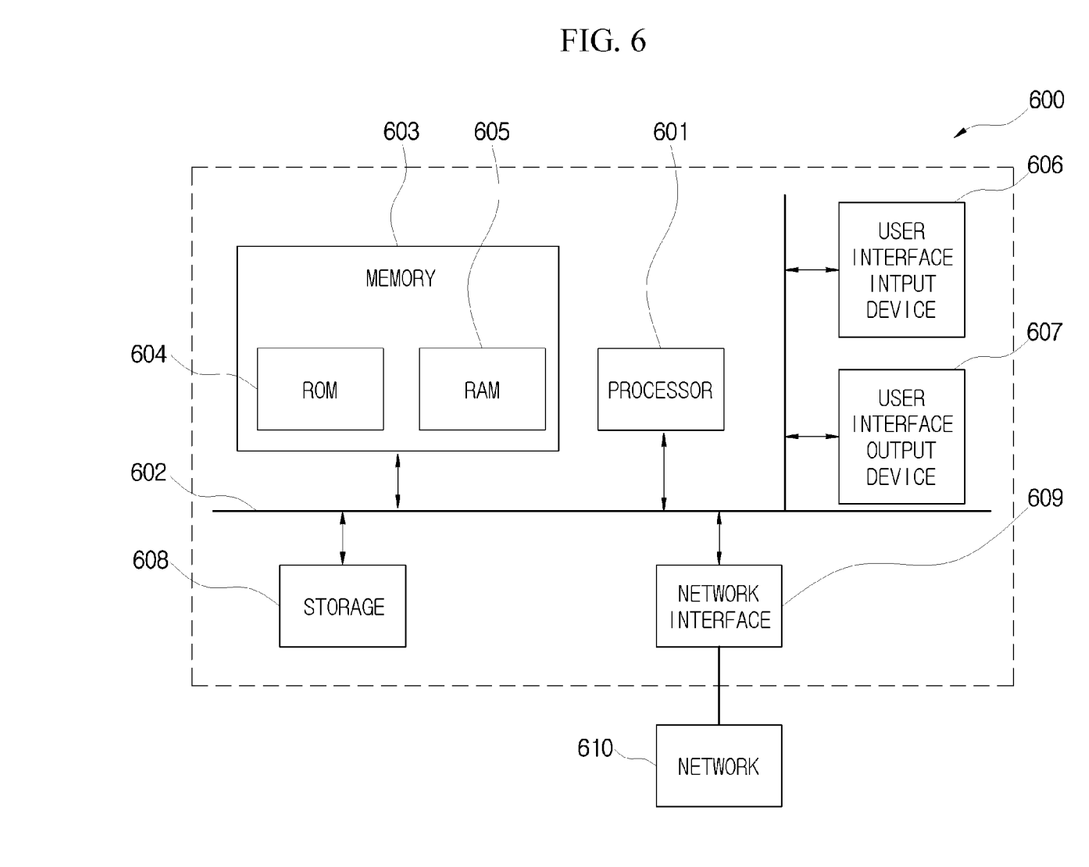
FIG. 6 is a block diagram illustrating a computer system for the present invention.

An embodiment of the present invention may be implemented in a computer system, e.g., as a computer readable medium. As shown in FIG. 6, a computer system 600 may include one or more of a processor 601, a memory 603, a user input device 606, a user output device 607, and a storage 608, each of which communicates through a bus 602. The computer system 600 may also include a network interface 609 that is coupled to a network 610. The processor 601 may be a central processing unit (CPU) or a semiconductor device that executes processing instructions stored in the memory 603 and/or the storage 608. The memory 603 and the storage 608 may include various forms of volatile or non-volatile storage media. For example, the memory may include a read-only memory (ROM) 604 and a random access memory (RAM) 605.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A low voltage DC-DC converter (LDC) control apparatus comprising:
    a comparator configured to compare a heat release temperature of an LDC with a predetermined criterion temperature;
    an adjustor configured to adjust a predetermined criterion current value according to a result of the comparison of temperature; and
    a controller configured to compare the adjusted criterion current value with an output current value being output from the LDC, and control the LDC by converting a control mode of the LDC according to a result of the comparison of current,
    wherein the adjuster is configured to subtract, in response to the heat release temperature being higher than the criterion temperature, a predetermined current value from the criterion current value.

2. The LDC control apparatus of claim 1, wherein the adjuster is configured to subtract, in response to the heat release temperature being higher than the criterion temperature, a predetermined current value corresponding to a difference between the heat release temperature and the criterion temperature from the criterion current value.

3. The LDC control apparatus of claim 1, wherein the controller is configured to convert, in response to the output current value exceeding the criterion current value, a control mode of the LDC to a constant current (CC) mode in which an output current of the LDC is controlled to correspond to the criterion current value.

4. The LDC control apparatus of claim 1, wherein the controller is configured to convert, in response to the output current value being equal to or lower than the criterion current value, a control mode of the LDC to a constant voltage (CV) mode in which an output voltage of the LDC is controlled to correspond to a predetermined criterion voltage value.

5. The LDC control apparatus of claim 1, wherein the LDC is a buck-boost converter for a 48 V mild hybrid system.

6. A method of preventing overheat of a low voltage DC-DC converter (LDC) by using an LDC control apparatus, the method comprising:
    comparing a heat release temperature of the LDC with a predetermined criterion temperature;
    adjusting a predetermined criterion current value according to a result of the comparison of temperature;
    comparing the adjusted criterion current value with an output current value being output from the LDC; and
    controlling the LDC by converting a control mode of the LDC according to a result of the comparison of current,
    wherein, in the adjusting of a predetermined criterion current value according to a result of the comparison of temperature, a predetermined current value is subtracted from the criterion current value if the heat release temperature is higher than the criterion temperature.

7. The method of claim 6, wherein in the adjusting of a predetermined criterion current value according to a result of the comparison of temperature, a predetermined current value corresponding to a difference between the heat release temperature and the criterion temperature is subtracted from the criterion current value if the heat release temperature is higher than the criterion temperature.

8. The method of claim 6, wherein in the controlling of the LDC by converting a control mode of the LDC according to a result of the comparison of current, a control mode of the LDC is converted to a constant current (CC) mode in which an output current of the LDC is controlled to correspond to the criterion current value if the output current value exceeds the criterion current value.

9. The method of claim 6, wherein in the controlling of the LDC by converting a control mode of the LDC according to a result of the comparison of current, a control mode of the LDC is converted to a constant voltage (CV) mode in which an output voltage of the LDC is controlled to correspond to a predetermined criterion voltage value if the output current value is equal to or lower than the criterion current value.

10. The method of claim 6, wherein the LDC is a buck-boost converter for a 48 V mild hybrid system.

* * * * *